US012475042B2

(12) United States Patent
Ye et al.

(10) Patent No.: US 12,475,042 B2
(45) Date of Patent: Nov. 18, 2025

(54) DEALLOCATING STORAGE RESOURCES BASED ON METADATA OF A DELETED OBJECT

(71) Applicant: Dell Products, L.P., Round Rock, TX (US)

(72) Inventors: Yi Ye, Shanghai (CN); Kalyan C. Gunda, Bangalore (IN); Jiang Cao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 24 days.

(21) Appl. No.: 18/403,708

(22) Filed: Jan. 3, 2024

(65) Prior Publication Data

US 2025/0217283 A1 Jul. 3, 2025

(51) Int. Cl.
*G06F 12/02* (2006.01)
*G06F 3/06* (2006.01)

(52) U.S. Cl.
CPC ........ *G06F 12/0253* (2013.01); *G06F 3/0653* (2013.01)

(58) Field of Classification Search
CPC ... G06F 3/0641; G06F 3/0653; G06F 12/0253
USPC ........................................................ 711/166
See application file for complete search history.

(56) References Cited

U.S. PATENT DOCUMENTS

| | | | | |
|---|---|---|---|---|
| 10,776,321 | B1 * | 9/2020 | Balcha | G06F 16/1752 |
| 2009/0271454 | A1 * | 10/2009 | Anglin | G06F 11/1453 |
| 2013/0268498 | A1 * | 10/2013 | Sisco | G06F 16/1752 |
| | | | | 707/E17.002 |
| 2015/0199367 | A1 * | 7/2015 | Hammer | G06F 16/1748 |
| | | | | 707/654 |
| 2019/0266100 | A1 * | 8/2019 | Mello | G06F 12/0246 |
| 2021/0064522 | A1 * | 3/2021 | Wang | G06F 3/0652 |

* cited by examiner

*Primary Examiner* — Hashem Farrokh
(74) *Attorney, Agent, or Firm* — Amin, Turocy & Watson, LLP

(57) ABSTRACT

The technologies described herein are generally directed toward deallocating storage resources based on metadata of a deleted object. In an embodiment, a method can include, based on an indication that a data object stored using storage resources of a data storage system is to be deleted, identifying metadata of a first chunk of storage of the data storage system. The method can further include based on the metadata of the first chunk of storage, selecting a deallocation approach from different deallocation approaches, the deallocation approach usable to designate the first chunk of storage as available for storage of one or more other data objects. Further, the method can include facilitating designation of the first chunk of storage as being available for the storage of the one or more other data objects in accordance with the deallocation approach.

20 Claims, 10 Drawing Sheets

800

OPERATION 802

BASED ON AN INDICATION THAT A DATA OBJECT STORED USING STORAGE RESOURCES OF A DATA STORAGE SYSTEM IS TO BE DELETED, IDENTIFYING METADATA OF A FIRST CHUNK OF STORAGE OF THE DATA STORAGE SYSTEM, WHEREIN THE STORAGE RESOURCES COMPRISE THE FIRST CHUNK OF STORAGE

OPERATION 804

BASED ON THE METADATA OF THE FIRST CHUNK OF STORAGE, SELECTING AN APPROACH OF A SET OF APPROACHES TO DESIGNATE THE FIRST CHUNK OF STORAGE AS AVAILABLE FOR STORAGE OF ANOTHER DATA OBJECT OTHER THAN THE DATA OBJECT, RESULTING IN A SELECTED APPROACH

OPERATION 806

DESIGNATING THE FIRST CHUNK OF STORAGE AS AVAILABLE IN ACCORDANCE WITH THE SELECTED APPROACH.

NON-TRANSITORY MACHINE-READABLE MEDIUM 810

FIG. 8

DEALLOCATING STORAGE RESOURCES BASED ON METADATA OF A DELETED OBJECT

BACKGROUND

Modern data storage systems can store data as data objects stored within data chunks of data storage space. Based on this approach, storage and retrieval of data can be simplified because data chunks can be manipulated without references being used that only operate on smaller amounts of storage space. Problems can occur however, when data chunks are used to store data from multiple data objects, e.g., because instead of manipulating data using commands applied to whole chunks of data, portions of chunks may need to be handled differently from other portions.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example data storage system can operate as follows. The system can include a processor and a memory that stores executable instructions that, when executed by the processor, facilitate performance of operations. The instructions can include an instruction to, based on an indication that a data object stored using storage resources of a data storage system is to be deleted, identify metadata of a first chunk of storage of the data storage system, with the storage resources including the first chunk of storage. The instructions can further include an instruction to, based on the metadata of the first chunk of storage, select a deallocation approach from different deallocation approaches, the deallocation approach usable to designate the first chunk of storage as available for storage of one or more other data objects. Further, the instructions can include an instruction to facilitate designation of the first chunk of storage as being available for the storage of the one or more other data objects in accordance with the deallocation approach.

Additionally, or alternatively, the deallocation process can include an immediate deallocation process that designates the first portion of storage as available for storage of a second data object other than the first data object without first copying data from the first portion of storage to a second portion of storage, and wherein the immediate deallocation process was selected by the controller based on the metadata indicating that the second data object does not reference the first portion of storage. Additionally, or alternatively, the deallocation process can include a reference deallocation process that designates the first portion of storage as available for storage of a second data object after first copying data from the first portion of storage to a second portion of storage, and wherein the reference deallocation process was selected by the controller based on the metadata indicating that another data object other than the first data object references the first portion of storage. Additionally, or alternatively the other data object can reference the first portion of storage along with the first data object, and after the data from the first portion of storage is copied to the second portion of storage, the other data object can be configured to reference the second portion of storage.

An example method can include, based on an indication that a data object stored using storage resources of a data storage system is to be deleted, identifying metadata of a first chunk of storage of the data storage system, with the storage resources including the first chunk of storage. The method can further include based on the metadata of the first chunk of storage, selecting a deallocation approach from different deallocation approaches, the deallocation approach usable to designate the first chunk of storage as available for storage of one or more other data objects. Further, the method can include facilitating designation of the first chunk of storage as being available for the storage of the one or more other data objects in accordance with the deallocation approach.

Additionally, or alternatively, the different deallocation approaches can include a first deallocation approach that can include designating the first chunk of storage as being available for the storage of the one or more other data objects without first copying data from the first chunk of storage to a second chunk of storage of the data storage system, and wherein, the first deallocation approach is selected in response to determining that the metadata specifies that no other data object stored using the storage resources of the data storage system, other than the data object, references data stored using the first chunk of storage. Additionally, or alternatively, the data can be referenced by another data object of the one or more other data objects, and the first deallocation approach can include designating the first chunk of storage as being available for the storage of the one or more other data objects without first copying the data to the second data chunk of storage. Additionally, or alternatively, the different deallocation approaches can further include a second deallocation approach that can include copying the data referenced by the other object to the second data chunk of storage, before designating the first chunk of storage as being available for the storage of the one or more other data objects, the second deallocation approach can be selected in response to determining that the metadata indicating that another data object references the first chunk of storage. Additionally, or alternatively, the metadata specifying the deallocation approach was generated at a time that the data object was stored at the first chunk of storage. Additionally, or alternatively, the metadata generated at the time that the data object was stored can include initial metadata, and wherein the initial metadata was changed before the indication that the data object is to be deleted to changed metadata, based on one or more data objects that reference the first chunk of storage being determined to have changed.

Additionally or alternatively, the data object can be a first data object, with the initial metadata included the first deallocation approach based on the one or more data objects referencing the first chunk of storage being determined to include only the first data object, and with the changed metadata including the second deallocation approach based on the one or more data objects referencing the first chunk of storage being determined to include the first data object and a second data object other than the first data object. Additionally or alternatively, the data object can be a first data object, with the initial metadata including the second deallocation approach based on the one or more data objects referencing the first chunk of storage being determined to include the first data object and a second data object other than the first data object, and with the changed metadata can include the first deallocation approach based on a reference of the second data object to the first chunk of storage being determined to have been removed.

Additionally or alternatively, the data object can be a first data object, with the one or more data objects referencing the first chunk of storage including the first data object referencing a portion of the first chunk of storage, and a second data object other than the first data object also referencing the portion of the first chunk of storage. Additionally or alternatively, the data object can be a first data object, with the one or more data objects referencing the first chunk of storage including the first data object referencing a first portion of the first chunk of storage, and a second data object other than the first data object referencing a second portion of the first chunk of storage.

Additionally or alternatively, the request can include a deduplication request to delete the data object as a duplicate of another data object stored at another storage location other than a storage location of the data object.

An example non-transitory computer-readable medium can include instructions that, in response to execution, cause a system including a processor to perform operations. These operations can include, based on an indication that a data object stored using storage resources of a data storage system is to be deleted, identifying metadata of a first chunk of storage of the data storage system, with the storage resources including the first chunk of storage. The operations can further include based on the metadata of the first chunk of storage, selecting a deallocation approach from different deallocation approaches, the deallocation approach usable to designate the first chunk of storage as available for storage of one or more other data objects. The operations can further include facilitating designation of the first chunk of storage as being available for the storage of the one or more other data objects in accordance with the deallocation approach.

Additionally, or alternatively, the non-transitory computer-readable medium can include the metadata specifying the approach being generated at a time that the data object was stored at the first chunk of storage. Additionally, or alternatively, the non-transitory computer-readable medium can include the metadata being generated at the time that the data object was stored includes initial metadata, and wherein the initial metadata was changed, before the indication that the data object is to be deleted, to changed metadata, based on at least one data object of data objects that reference the first chunk of storage being determined to have changed. Additionally, or alternatively, the non-transitory computer-readable medium can include the initial metadata including first metadata representative of the first approach based on the at least one data object being determined to include only the data object, and wherein the changed metadata included second metadata representative of the second approach based on the at least one data object referencing the first chunk of storage being determined to include the data object and at least one other data object other than the data object.

Other embodiments may become apparent from the following detailed description when taken in conjunction with the drawings.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 depicts an example non-transitory machine-readable medium that can include executable instructions that, when executed by a processor of a system, can facilitate deallocating storage resources based on metadata of a deleted object, in accordance with one or more embodiments.

DETAILED DESCRIPTION

Generally speaking, one or more embodiments described herein can facilitate deallocating storage resources based on metadata of a deleted object. As is understood by one having skill in the relevant art(s), given the description herein, the implementation(s) described herein are non-limiting examples, and variations to the technology can be implemented. For instance, even though many examples described herein discuss cloud storage devices, the technologies described herein can be used in many circumstances applicable to different embodiments discussed herein. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
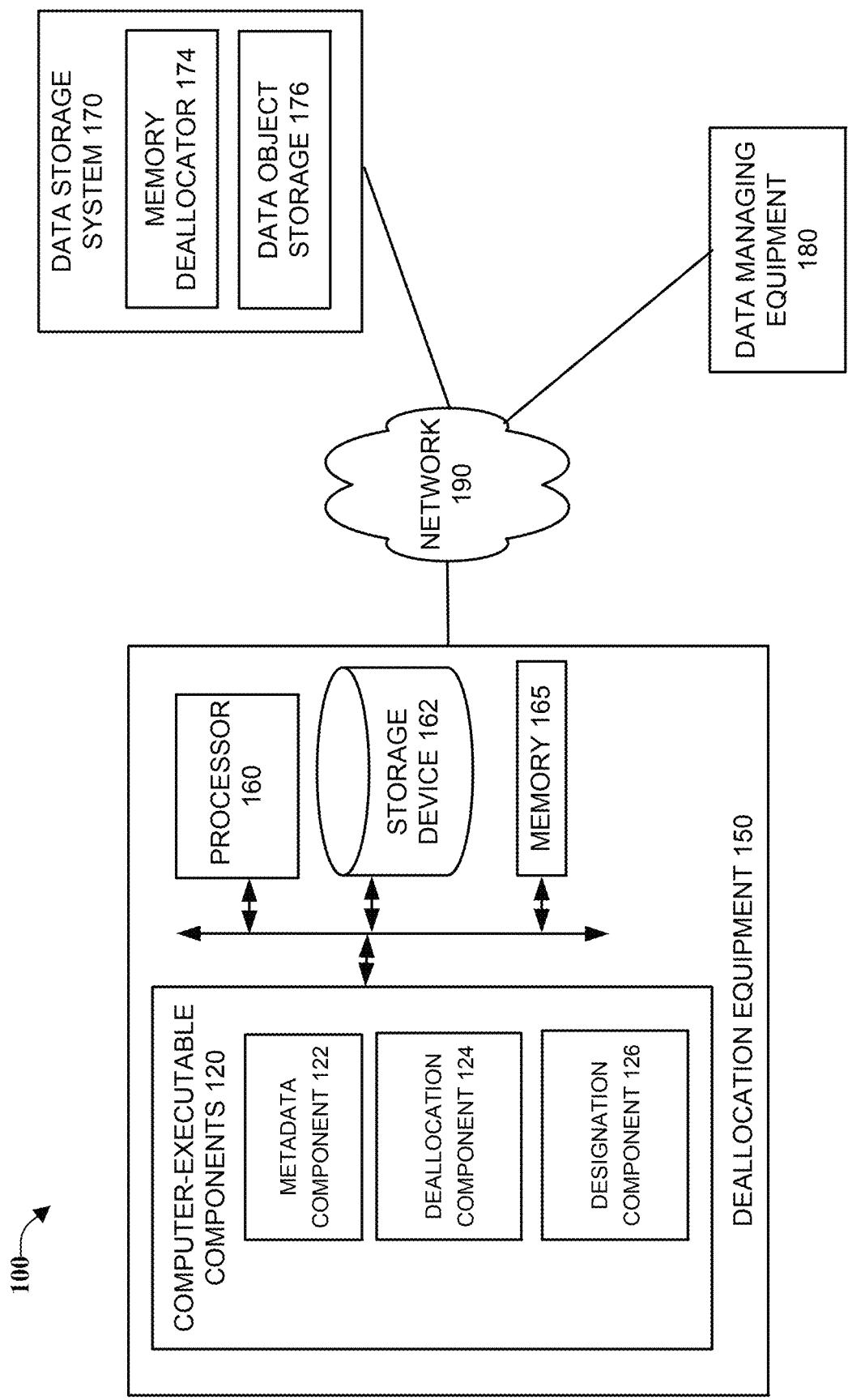
FIG. 1 is an architecture diagram of an example system that can facilitate deallocating storage resources based on metadata of a deleted object, in accordance with one or more embodiments.

FIG. 1 is an architecture diagram of an example system 100 that can facilitate deallocating storage resources based on metadata of a deleted object, in accordance with one or more embodiments. For purposes of brevity, description of like elements and/or processes employed in other embodiments is omitted. As depicted, system 100 includes deallocation equipment 150 connected to data storage system 170 and data management equipment 180 via network 190. As depicted data storage system 170 includes memory deallocator 174, and data object storage 176.

As depicted deallocation equipment 150 includes memory 165, processor 160, and storage component 162. According to multiple embodiments, memory 165 of deallocation equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include metadata component 122, deallocation component 124, designation component 126, and other components described or suggested by different embodiments described herein, that can improve the operation of system 100 or other systems described herein.

In one or more embodiments, data storage system 170 can provide non-volatile storage of data, data structures, computer-executable instructions, and so forth. For data object storage 176, drives and storage media can accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

In some implementations, data storage system 170 can be a block-based storage system, e.g., storing file/object data in protected blocks call chunks. As used herein, a chunk is an example resource allocation unit, object data is written on chunks in append-only style. In one or more embodiments, a garbage collection routine can be utilized to deallocate chunks after files/objects are deleted, e.g., implemented by memory deallocator 174. Example data storage systems which can employ one or more of the approaches described with embodiments herein include, but are not limited to DELL ELASTIC CLOUD STORAGE (ECS)™, a non-limiting example network attached enterprise object storage platform provided by DELL EMC, Inc. An example enterprise object storage architecture that can facilitate the operation of one or more embodiments by DELL ECS, is OBJECTSCALE.™ Further examples of computer components associated with data storage system 170 are discussed with reference to FIG. 10.

According to multiple embodiments, processor 160 can include one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to logic, control, input/output (I/O), arithmetic, and/or the like. In some embodiments, processor 160 can include one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can include volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can include non-volatile random-access memory (NVRAM).

It is understood that the computer processing systems, computer-implemented methods, apparatus, and computer program products described herein employ computer hardware and/or software to solve problems that are highly technical in nature (e.g., managing hybrid garbage collection in a large data storage system), that are not abstract and cannot be performed as a set of mental acts by a human. For example, a human, or even a plurality of humans, cannot efficiently handle the complex, rapid management of different deallocation tasks.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of metadata component 122, which can in some implementations based on an indication that a data object stored using storage resources of a data storage system is to be deleted, identify metadata of a first chunk of storage of the data storage system, with the storage resources including the first chunk of storage. For example, in one or more embodiments, metadata component 122 can, based on an indication that a data object stored using data object storage 176 of data storage system 170 is to be deleted, identify metadata of a first chunk of storage of data storage system 170, with the storage resources including the first chunk of storage.

In another example, memory 165 can store executable instructions that can facilitate generation of deallocation component 124, which can, in some implementations based on the metadata of the first chunk of storage, select a deallocation approach from different deallocation approaches, the deallocation approach usable to designate the first chunk of storage as available for storage of one or more other data objects. For example, in one or more embodiments, deallocation component 124 can, based on the metadata of the first chunk of storage, select a deallocation approach from different deallocation approaches, the deallocation approach usable to designate the first chunk of storage as available for storage of one or more other data objects.

In another example, memory 165 can store executable instructions that can facilitate generation of designation component 126, which can, in some implementations facilitate designation of the first chunk of storage as being available for the storage of the one or more other data objects in accordance with the deallocation approach. For example, in one or more embodiments, designation component 126 can facilitate designation of the first chunk of storage as being available for the storage of the one or more other data objects in accordance with the deallocation approach.

It is appreciated that the embodiments of the subject disclosure depicted in various figures disclosed herein are for illustration only, and as such, the architecture of such embodiments are not limited to the systems, devices, and/or components depicted therein. For example, in some embodiments, deallocation equipment 150 deallocation equipment 150, data storage system 170, and data management equipment 180, can further include various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that deallocation equipment 150, data storage system 170, data management equipment 180, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as deallocation equipment 150. For example, one or more of deallocation equipment 150, data storage system 170, data management equipment 180, and other equipment discussed herein can all be separate subsystems running in the kernel of a computing device as well as operating on separate network equipment, e.g., as depicted in FIG. 1.

Figure 2:
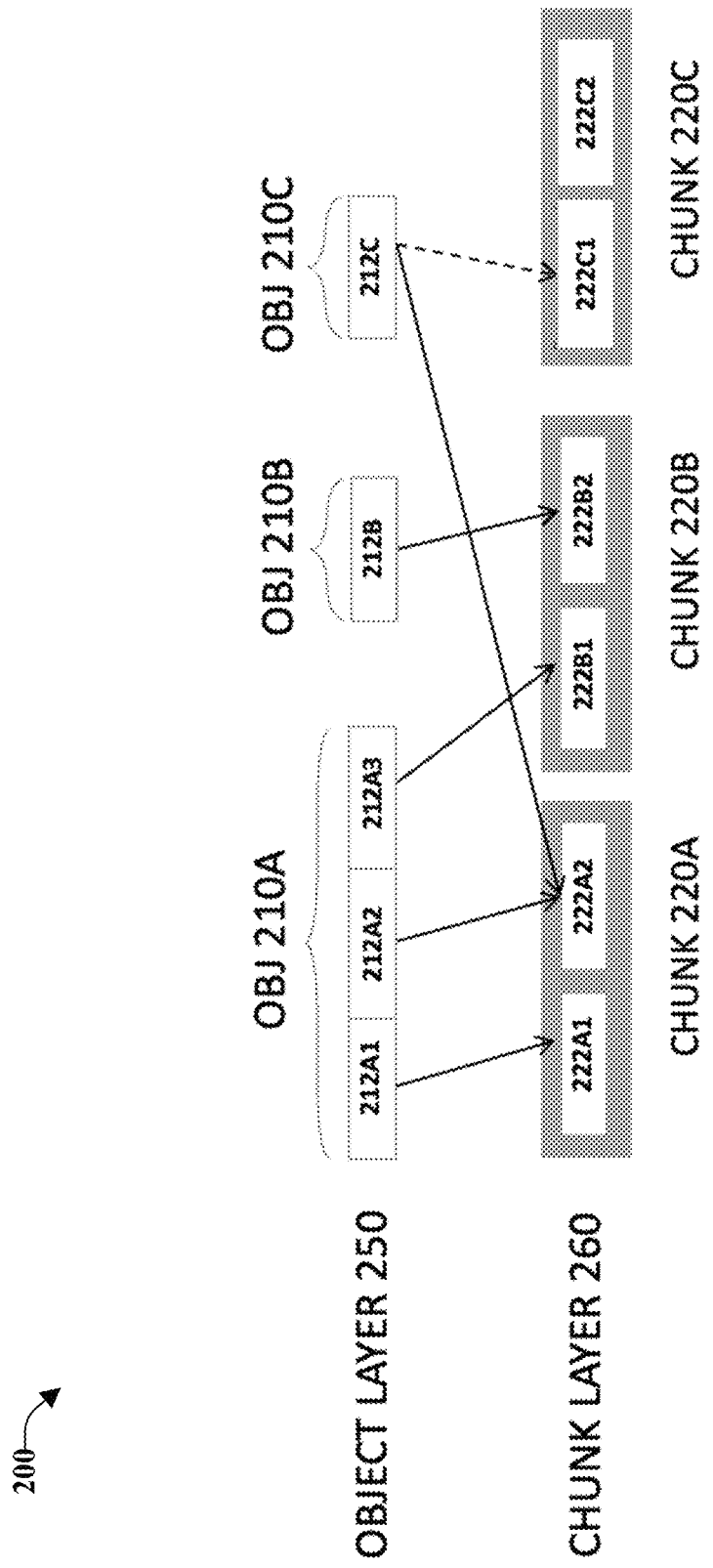
FIG. 2 is a diagram of an example system that can facilitate deallocating storage resources based on metadata of a deleted object, in accordance with one or more embodiments.

FIG. 2 is a diagram of an example system 200 that can facilitate deallocating storage resources based on metadata of a deleted object, in accordance with one or more embodiments. For purposes of brevity, description of like elements and/or processes employed in other embodiments is omitted. As depicted, system 200 includes object layer 250, with data objects 210A-C, and chunk layer 260, with chunks 220A-C. As depicted, data objects are divided into multiple chunk portions, with respective chunk portions corresponding to parts of data objects 210A-C.

For example, part 212A1 of data object 210A is stored at chunk portion 222A1 of chunk 220A, part 212A2 of data object 210A is stored at chunk portion 222A2 of chunk 220A, part 212A3 of data object 210A is stored at chunk portion 222B1 of chunk 220B, part 212B of data object 210B is stored at chunk portion 222B2 of chunk 220B, part 212C of data object 210C references chunk portion 222A2 of chunk 220A, and chunk portion 222C2 of chunk 220C is not currently being utilized to store data objects. It should be noted that, as illustrated in FIG. 2, data objects can have parts stored across several chunks (e.g., object 210A in chunk portions across chunks 220A-B), and data objects can be composed of the same part of a data chunk (e.g., chunk portion 222A2 is shared by both objects 210A and 210C.

As is discussed further below, some embodiments handle the deletion of object 210A-B from data object storage 176, with a garbage collection process that frees up the respective data chunks allocated to the deleted objects 210A-B. In an example situation, a dotted line shows part 212C of data object 210C stored at chunk portion 222C1 of chunk 220C, and in this example, when data object 210C is deleted, chunk 220C can be reallocated as free to store new data, e.g., by a garbage collection process. In another example, when object 210A is deleted, because other data objects also reference the utilized data chunks 220B (e.g., data object 210B referencing data chunk 222B2), before data chunk 220B can be reallocated as free to store new data, one or more embodiments can utilize a different process, discussed with FIG. 3 below.

Figure 3:
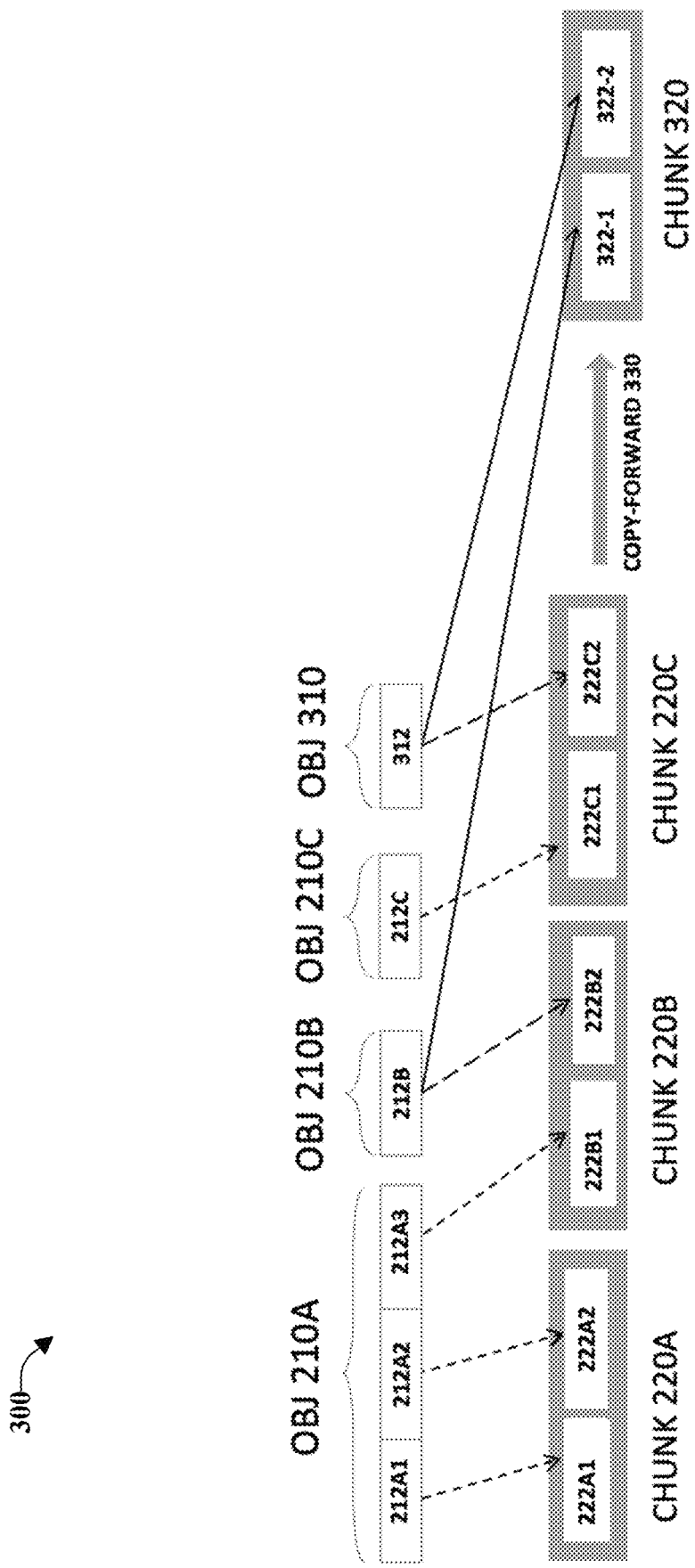
FIG. 3 is a diagram of an example system that can facilitate deallocating storage resources based on metadata of a deleted object, in accordance with one or more embodiments.

FIG. 3 is a diagram of an example system 300 that can facilitate deallocating storage resources based on metadata of a deleted object, in accordance with one or more embodiments. For purposes of brevity, description of like elements and/or processes employed in other embodiments is omitted. As depicted, system 300 includes data objects 210A-C, and 310, chunks 220A-C and chunk 320.

Continuing the example of FIG. 2, when object 210A is deleted, because other data objects also reference the utilized data chunk 220B (e.g., data object 210B referencing data chunk 222B2), before data chunk 220B can be reallocated as free to store new data, one or more embodiments can utilize copy forward 330 approach depicted in FIG. 3. With this approach, before deallocation of chunk 220B, chunk 320 can be selected to receive and store part 212B of object 210B, e.g., at chunk portion 322-1 of chunk 320.

In an additional aspect of this example, object 210C has been deleted, and a deallocation approach has been selected that uses the copy forward 330 process to identify data chunk 222C2 (e.g., storing part 312 of object 310) as also being stored on chunk 220C. Once identified, with this approach, before deallocation of chunk 220C, chunk 320 can be selected to receive and store part 312 of object 310, e.g., at chunk portion 322-2 of chunk 320.

In one or more embodiments, one way of selecting between the approaches of FIGS. 2-3 is to determine the number of data objects that reference data chunk to be deallocated. For example, for chunk 220A the number of references is one, e.g., only data object 210A references data chunk 220A. Based on this single object referencing chunk 220A, the approach of FIG. 2 can be selected, e.g., deallocation of chunk 220A without data from chunk 220A being stored in a different chunk.

In contrast, when the number of data object references to a chunk is greater than one, the approach of FIG. 3 can be selected, e.g., identifying chunk portions storing data of other objects, and then moving this data to a different chunk. Because chunk 220B is sought to be deallocated after the deletion of data object 210A (e.g., storing data in chunk portion 222B1), the approach of FIG. 3 can be selected, e.g., copying chunk portion 222B2 to chunk portion 322-2 of chunk 320.

Depending upon the deallocation approach selected for a particular circumstance, the approaches can have different advantages and disadvantages. For example, by immediately deallocating chunks that are only referenced by a deleted data object, overhead associated with selecting a destination chunk and copying data from the chunk to be deallocated can be avoided.

Figure 4:
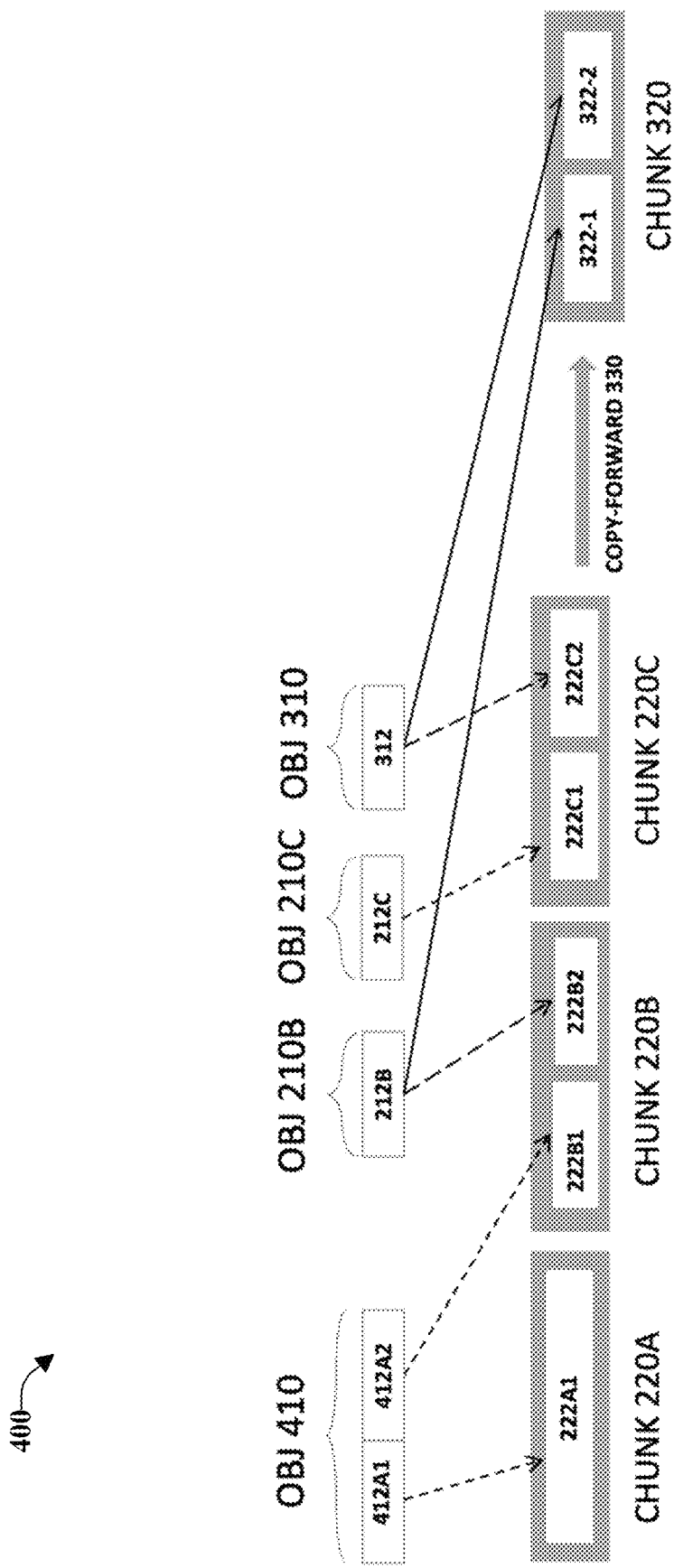
FIG. 4 is a diagram of an example system that can facilitate deallocating storage resources based on metadata of a deleted object, in accordance with one or more embodiments.

FIG. 4 is a diagram of an example system 400 that can facilitate deallocating storage resources based on metadata of a deleted object, in accordance with one or more embodiments. For purposes of brevity, description of like elements and/or processes employed in other embodiments is omitted.

In previous examples, chunk portions (e.g., chunk portions 222A1-2) are depicted and discussed as being of fixed sizes. An example depicted in FIG. 4 shows chunk portion 222A1 as taking up all of the available storage of chunk 220A to store part 412A1 of object 410, while chunk portions 222B1-2 are of fixed sizes, and share the available storage space of chunk 220B. Considering the allocation approaches described above, for the deallocation approach applied to chunk 220A, the immediate deallocation approach can be selected because, by taking up the entire chunk 220A storage space, no other objects can reference chunk 220A. Further, as discussed above, because storage space of chunk 220B is shared by data object 410 and data object 210B, the copy forward approach described with FIG. 3 can be selected. In contrast, the selection and application of the immediate deallocation approach can be accomplished faster, and without application of overhead to evaluate the number of data object references of a data chunk.

In different embodiments, the point when a deallocation approach is selected to apply to a chunk can have different advantages and disadvantages. For example, selection of the immediate approach or the copy-forward approach can involve the evaluation of the number of data objects that reference a chunk subject to deallocation, and this evaluation and deallocation selection based on the evaluation, can involve a time delay and other system overhead. To help reduce the amount of overhead associated with the deallocation of data chunks, one or more embodiments can utilize a hybrid approach to deallocation, such as the approach described below.

To obtain the advantages of both approaches with a hybrid approach, one or more embodiments can specify the chunk deallocation approach to be applied to a particular chunk at the time chunk portions are allocated to store parts of stored objects, with this specification being stored in metadata of the chunk. For example, for the storage of parts 212A1-2 of data object 210A of FIG. 3, when chunk portions 222A1-2 are initially allocated to store parts 212A1-2 respectively, metadata can be added to chunk 220A that specifies the immediate deallocation approach. Based on this storage of metadata upon initial allocation, upon deletion of data object 210A, this metadata can be rapidly read and, without further analysis of the number of data objects that reference chunk 220A, chunk 220A can be immediately deallocated for storage of new object data. Stated differently, upon an object deletion request being received for object 210A, chunk 220A, having metadata specifying an immediate deallocation approach, can be deallocated immediately and synchronously without any delay.

Continuing this example, upon the storage of part 212A3 of data object 210A to chunk portion 222B1, metadata can be added to chunk 220B that specifies that the number of references to chunk 220B should be evaluated upon selection of a deallocation process to apply to chunk portions of chunk 220B. Based on this approach, the higher overhead process of evaluating the number of references to chunk 220B can be used only when needed to resolve ambiguity as to which deallocation approach is required. Stated differently, upon the object deletion request being received for object 210A, chunk 220B, having metadata specifying that reference counting is to be performed to select a deallocation approach, and, before object 210B references chunk 220B (e.g., storing data in chunk portion 222B2), this reference evaluation can indicate that only object 210A is storing data at chunk 220B, and the immediate deallocation approach can be selected.

Continuing this example, when data object 210B is initially stored using the remaining storage space available at chunk 220B (e.g., chunk portion 222B2), because the number of references to chunk 220B is now known to be greater than one, then metadata of chunk 220B can be altered such that, instead of metadata that specifies that reference counting should be performed at deallocation, the metadata of chunk 220B can be changed to specify that the copy-forward approach is to be used without assessment of the number of references to chunk 220B. Based on this metadata specification, similar to the overhead savings discussed with chunk 220A above (e.g., immediate deallocation without reference analysis), for the deletion of data object 210A and the deallocation of chunk portion 222B1, the copy-forward approach can be applied to chunk portion 222B2 without the overhead associated with the analysis of the number of references to chunk 220B. Stated differently, upon an object deletion request being received for object 210A, chunk 220B, now having metadata specifying that the copy-forward approach is to be used (e.g., without assessment of the number of references to chunk 220B), the data of chunk portion 222B2 can be copied to chunk portion 322-1 of chunk 320 without delay.

Returning to the example of data object 410 of FIG. 4, upon initial storage of part 412A1 of data object 410 at chunk portion 222A1 of chunk 220A, metadata can be added to chunk 220A specifying that the immediate deallocation approach can be used to deallocate chunk 220A. For the storage of part 412A2 of object 410 at chunk portion 222B1 of chunk 220B, metadata can be added to chunk 220B that specifies that reference evaluation should be performed to select a deallocation approach. For the storage of object 210B at portion 222B2 of chunk 220B, based on object 410 already being stored at chunk portion 222B1, the metadata of chunk 220B can be altered to specify that the copy forward approach should be selected (e.g., without any high-overhead reference analysis performed to determine if this approach is appropriate).

In one or more embodiments, based on the manipulation of metadata at chunk layer 260, no modifications of upper layer applications are required for implementation. In addition, based on the elimination of reference counting at the time of deallocation (e.g., with the metadata of data chunks specifying the deallocation approach), system performance can be increased over alternative approaches. These performance enhancements can include the promptness of deallocation, and the efficiency of data storage within the system.

Figure 5:
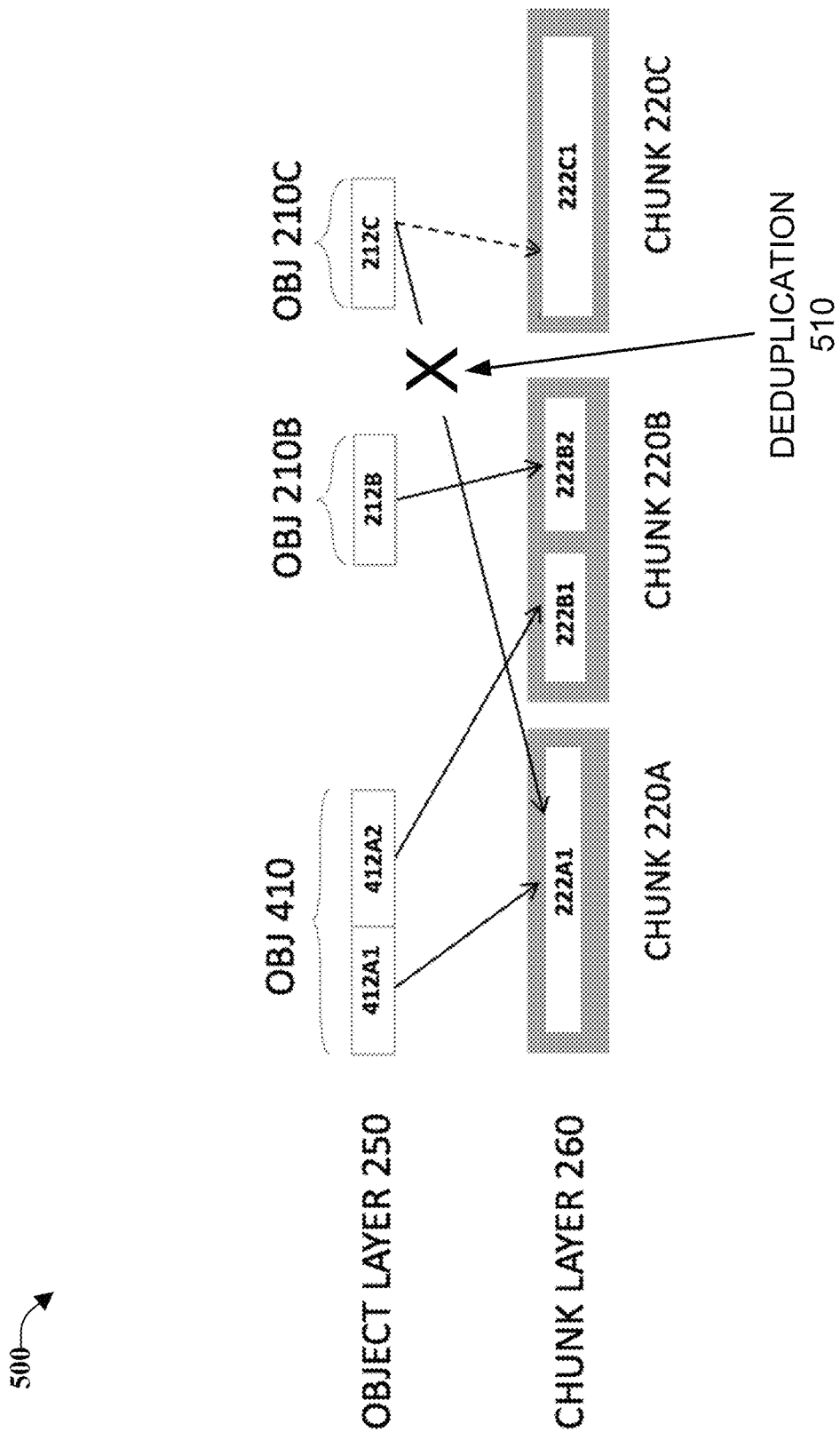
FIG. 5 is an architecture diagram of an example system that can facilitate deallocating storage resources based on metadata of a deleted object, in accordance with one or more embodiments.

FIG. 5 is an architecture diagram of an example system 500 that can facilitate deallocating storage resources based on metadata of a deleted object, in accordance with one or more embodiments. For purposes of brevity, description of like elements and/or processes employed in other embodiments is omitted. As depicted, system 300 includes object layer 250 with object 410 with parts 412A1-2, object 210B with part 212B, and object 210C with part 212C. In chunk layer 260, chunk 220A includes chunk portion 222A1 storing data utilized by part 412A1 and 212C, chunk 220B includes chunk portion 222B1 storing part 412A2 and chunk portion 222B2 storing part 212B, and chunk 220C stores a duplicate of chunk portion 222A1.

In this example, object part 412A1 was initially stored in chunk portion 222A1, and because no other objects referenced chunk 220A, metadata was be added to chunk 220A that specified the immediate deallocation approach be used for garbage collection, if needed. When the data of object 210C is stored (e.g., by reference) at chunk portion 222A1, the metadata of chunk 220A was changed to specify that the copy-forward approach was to be used without assessment of the number of references to chunk 220A.

In one or more embodiments, different approaches can be used to deduplicate chunk layer 260. In the example depicted, chunk portion 222C1 of chunk 220C has been detected as a duplicate of chunk portion 222A1 of chunk 220A. Upon deduplication 510, the link between object part 212C and chunk portion 222A1 is removed, thereby removing the additional reference to chunk 220A. To maintain the deallocation metadata as described above, at the point that the link is removed, one or more embodiments can alter the metadata of chunk 220A to return the specification to the immediate deallocation approach, as originally specified.

Once we detect if several objects have the same content, or just parts of an object are the same as other parts of the object, one object/part among these objects/parts is selected as source object/part, others become the duplicated objects/parts. Duplicated objects/parts' metadata is updated to replace their original data locations with the data locations of source objects/parts with the same content.

Figure 6:
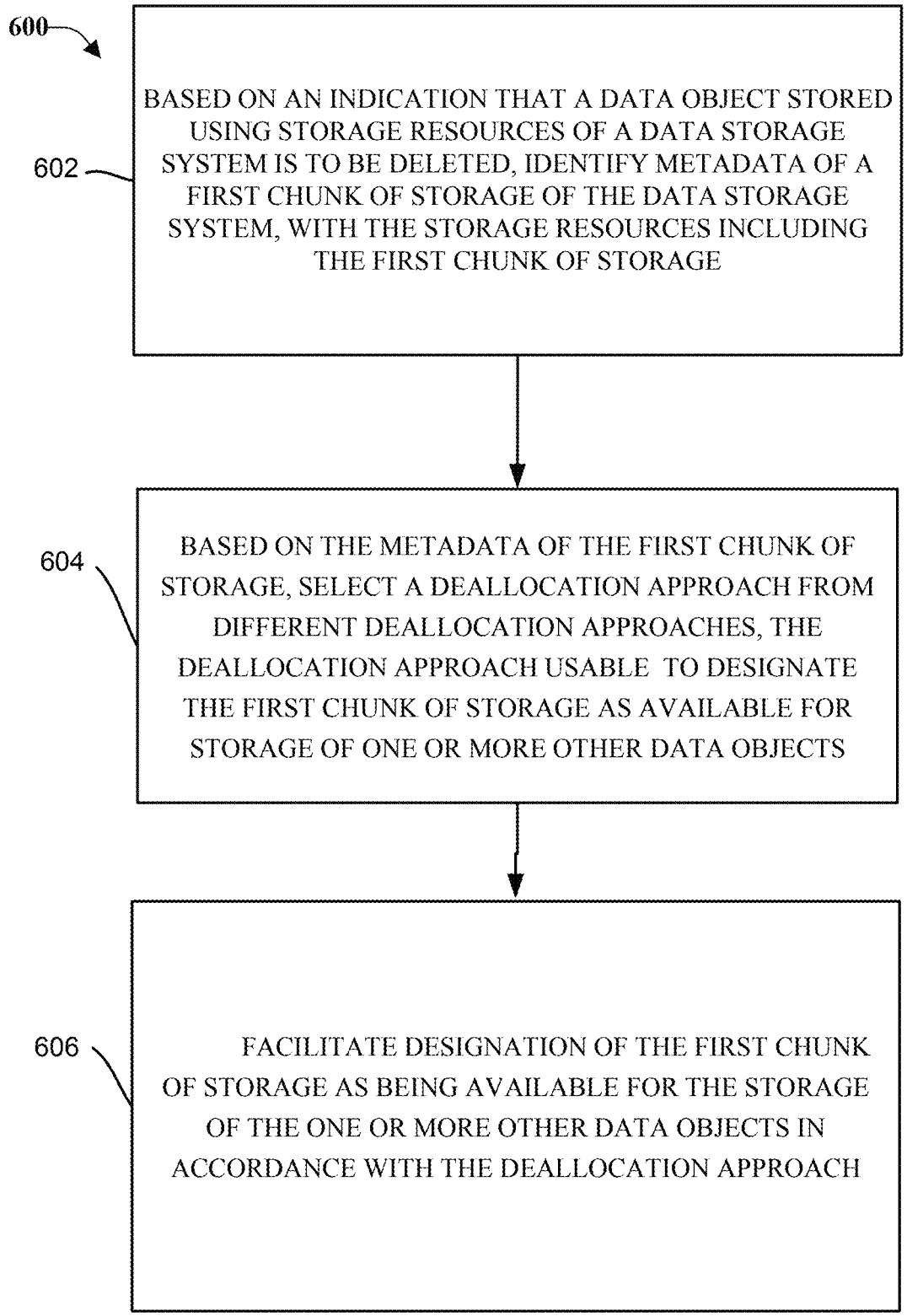
FIG. 6 depicts a flow diagram representing example operations of an example method that can facilitate deallocating storage resources based on metadata of a deleted object, in accordance with one or more embodiments.

FIG. 6 depicts a flow diagram representing example operations of an example method 600 that can facilitate deallocating storage resources based on metadata of a deleted object, in accordance with one or more embodiments. For purposes of brevity, description of like elements and/or processes employed in other embodiments is omitted.

In some examples, one or more embodiments of method 600 can be implemented by metadata component 122, deallocation component 124, designation component 126, and other components that can be used to implement aspects of method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, metadata component 122 can, in one or more embodiments, based on an indication that a data object stored using storage resources of a data storage system is to be deleted, identify metadata of a first chunk of storage of the data storage system, with the storage resources including the first chunk of storage. At 604 of method 600, deallocation component 124 can, in one or more embodiments, based on the metadata of the first chunk of storage, select a deallocation approach from different deallocation approaches, the deallocation approach usable to designate the first chunk of storage as available for storage of one or more other data objects. At 606 of method 600, designation component 126 can, in one or more embodiments facilitate designation of the first chunk of storage as being available for the storage of the one or more other data objects in accordance with the deallocation approach.

Figure 7:
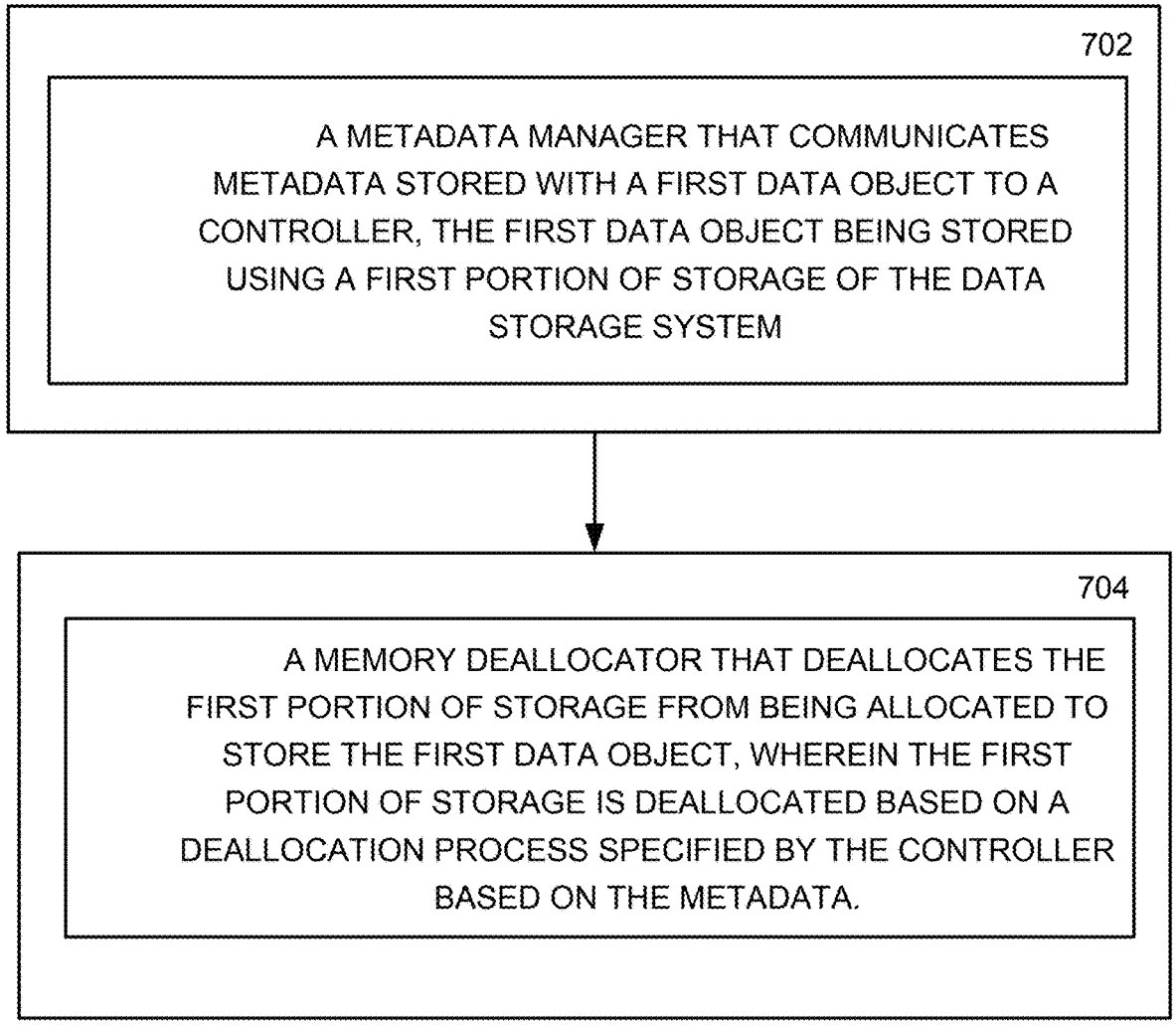
FIG. 7 depicts an example system that can facilitate deallocating storage resources based on metadata of a deleted object, in accordance with one or more embodiments.

FIG. 7 depicts an example system 700 that can facilitate deallocating storage resources based on metadata of a deleted object, in accordance with one or more embodiments. For purposes of brevity, description of like elements and/or processes employed in other embodiments is omitted. Example system 700 can include components that can be used to implement aspects of system 700, as described herein, in accordance with one or more embodiments.

At 702 of FIG. 7, system 700 can include a metadata manager that communicates metadata stored with a first data object to a controller, the first data object being stored using a first portion of storage of the data storage system. At 704 of FIG. 7, the method can include a memory deallocator that deallocates the first portion of storage from being allocated to store the first data object, wherein the first portion of storage is deallocated based on a deallocation process specified by the controller based on the metadata.

FIG. 8 depicts an example 800 non-transitory machine-readable medium 810 that can include executable instructions that, when executed by a processor of a system, can facilitate deallocating storage resources based on metadata of a deleted object, in accordance with one or more embodiments. For purposes of brevity, description of like elements and/or processes employed in other embodiments is omitted.

Operation 802 of FIG. 8 includes executable instructions that facilitate performance of operations comprising, based on an indication that a data object stored using storage resources of a data storage system is to be deleted, identifying metadata of a first chunk of storage of the data storage system, wherein the storage resources comprise the first chunk of storage.

Operation 804 of FIG. 8 includes executable instructions that facilitate performance of operations comprising, based on the metadata of the first chunk of storage, selecting an approach of a set of approaches to designate the first chunk of storage as available for storage of another data object other than the data object, resulting in a selected approach. Operation 806 of FIG. 8 can facilitate performance of operations, comprising designating the first chunk of storage as available in accordance with the selected approach.

Figure 9:
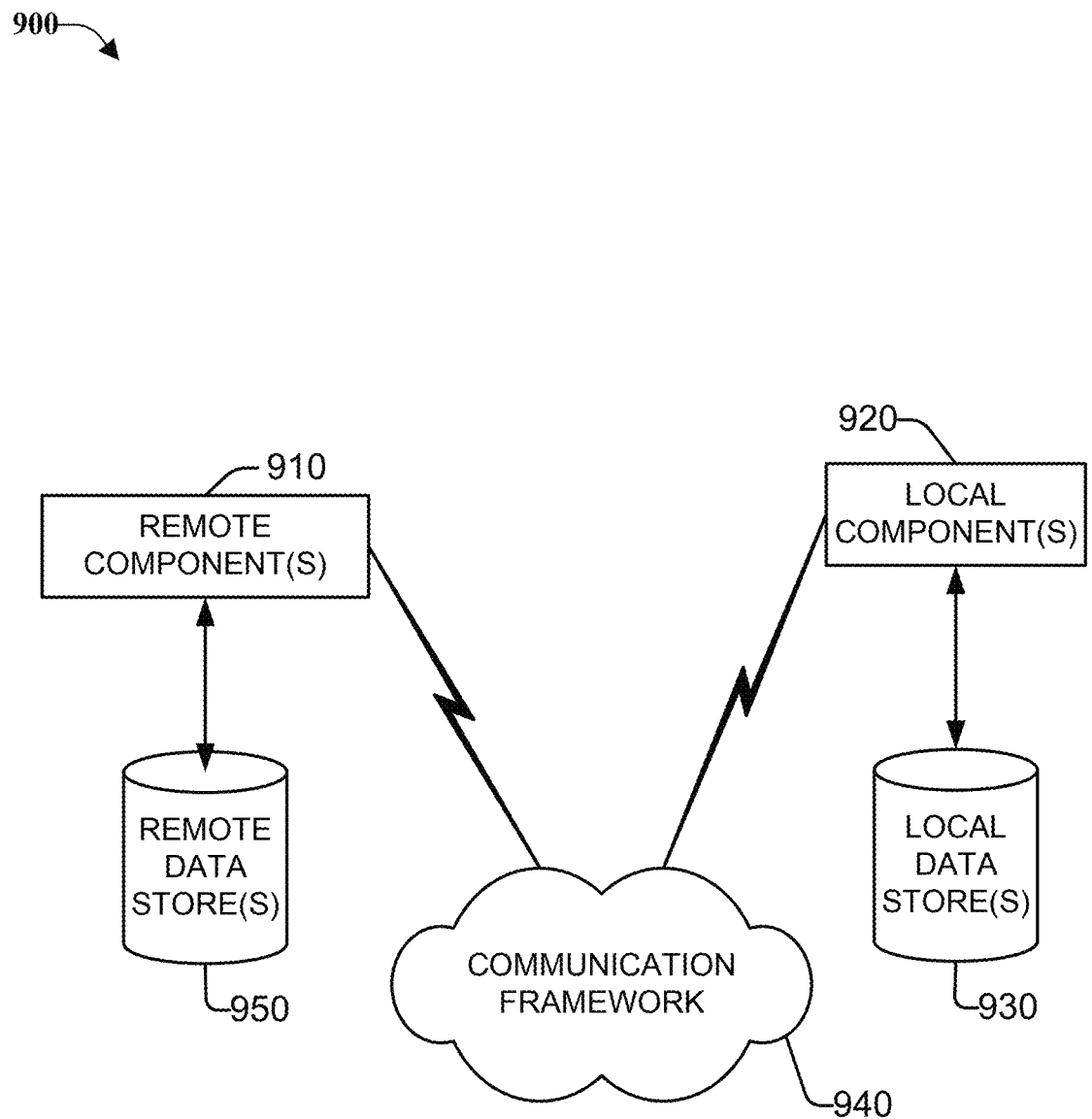
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact, in accordance with one or more embodiments. The system 900 includes one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can include wired network devices, wireless network devices, mobile devices, wearable devices, radio access network devices, gateway devices, femtocell devices, servers, etc.

The system 900 also includes one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 includes a communication framework 940 that can be employed to facilitate communications between the remote component(s) 910 and the local component(s) 920, and can include an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 920, non-volatile memory 922, disk storage 924, and memory storage, e.g., local data store(s) 930 and remote data store(s) 950, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
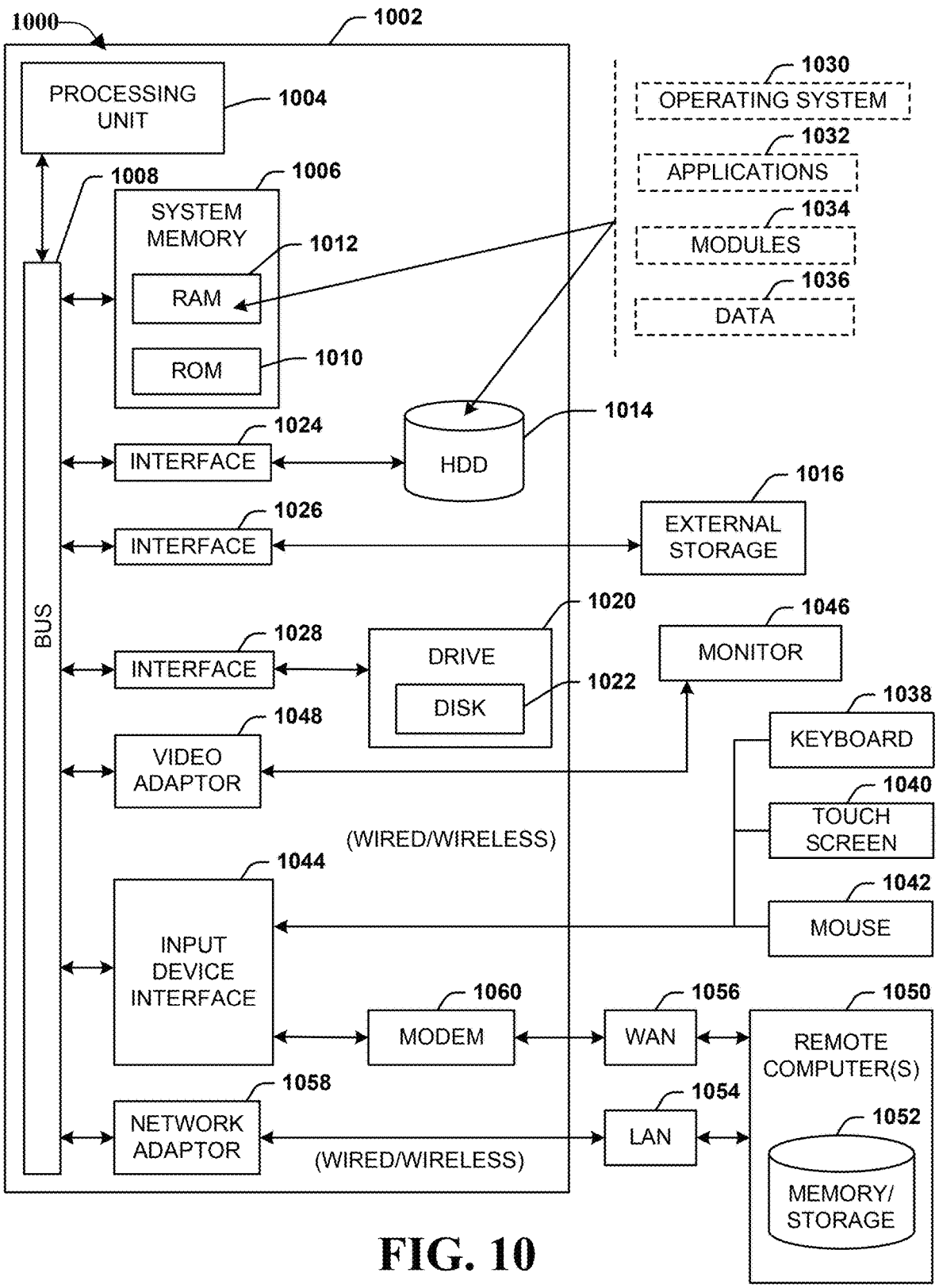
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
 based on an indication that a data object stored using storage resources of a data storage system is to be deleted, identifying, by a controller device comprising at least one processor, metadata of a first chunk of storage of the data storage system, the data object being stored using the first chunk of storage;
 based on the metadata of the first chunk of storage, selecting, by the controller device, a deallocation approach from different deallocation approaches, wherein the deallocation approach is usable to designate the first chunk of storage as available for storage of one or more other data objects; and
 facilitating, by the controller device, designation of the first chunk of storage as being available for the storage of the one or more other data objects in accordance with the deallocation approach, wherein the different deallocation approaches comprise:
  a first deallocation approach that comprises designating the first chunk of storage as available for storage of other data objects other than the data object without first copying any data from the first chunk of storage to a second data chunk of storage of the data storage system, wherein the first deallocation approach is selected based on the metadata specifying that no other data object references any data stored using the first chunk of storage, and wherein the first deallocation approach further comprises designating the first chunk of storage as available without first copying any data, referenced by another data object other than the data object, to the second data chunk of storage, and
  a second deallocation approach, different from the first deallocation approach, that comprises copying the data referenced by the other object to the second data chunk of storage, before designating the first chunk of storage as available for storage of the other data objects.

2. The method of claim 1, wherein the second deallocation approach is selected in response to determining that the metadata indicates that another data object references the first chunk of storage.

3. The method of claim 1, wherein the metadata specifying the deallocation approach was generated at a time that the data object was stored at the first chunk of storage.

4. The method of claim 3, wherein the metadata generated at the time that the data object was stored comprises initial metadata, and wherein the initial metadata was changed to changed metadata before the indication that the data object is to be deleted, based on one or more data objects that reference the first chunk of storage being determined to have changed.

5. The method of claim 4, wherein the data object comprises a first data object, wherein the initial metadata comprised the first deallocation approach based on the one or more data objects referencing the first chunk of storage being determined to comprise only the first data object, and wherein the changed metadata comprises the second deallocation approach based on the one or more data objects referencing the first chunk of storage being determined to comprise the first data object and a second data object other than the first data object.

6. The method of claim 4, wherein the data object comprises a first data object, wherein the initial metadata comprised the second deallocation approach based on the one or more data objects referencing the first chunk of storage being determined to comprise the first data object and a second data object other than the first data object, and wherein the changed metadata comprises the first deallocation approach based on a reference of the second data object to the first chunk of storage being determined to have been removed.

7. The method of claim 4, wherein the data object comprises a first data object, and wherein the one or more data objects referencing the first chunk of storage comprise the first data object referencing a portion of the first chunk of storage, and a second data object other than the first data object also referencing the portion of the first chunk of storage.

8. The method of claim 4, wherein the data object comprises a first data object, and wherein the one or more data objects referencing the first chunk of storage comprise the first data object referencing a first portion of the first chunk of storage, and a second data object other than the first data object referencing a second portion of the first chunk of storage.

9. The method of claim 1, wherein the indication comprises a deduplication request to delete the data object as a duplicate of another data object stored using other storage resources other than the storage resources of the data object.

10. A data storage system, comprising
 at least one processor; and
 at least one memory that stores executable components that, when executed by the at least one processor, facilitate performance of operations, comprising:

a metadata manager that communicates metadata stored with a first data object to a controller, the first data object being stored using a first portion of storage of the data storage system, and a memory deallocator that deallocates the first portion of storage from being allocated to store the first data object, wherein the first portion of storage is deallocated based on a deallocation process of a set of deallocation processes, wherein the deallocation process was selected by the controller based on the metadata, wherein the set of deallocation processes comprises an immediate deallocation process that designates the first portion of storage as available for storage of a second data object other than the first data object without first copying data from the first portion of storage to a second portion of storage, and wherein the immediate deallocation process was selected by the controller based on the metadata indicating that the second data object does not reference the first portion of storage.

11. The data storage system of claim 10,
wherein the set of deallocation processes further comprises a reference deallocation process that designates the first portion of storage as available for storage of the second data object after first copying data from the first portion of storage to the second portion of storage, and
wherein the reference deallocation process was selected by the controller based on the metadata indicating that another data object other than the first data object references the first portion of storage.

12. The data storage system of claim 11, wherein the other data object references the first portion of storage along with the first data object, and wherein, after the data from the first portion of storage is copied to the second portion of storage, the other data object is configured to reference the second portion of storage.

13. The data storage system of claim 10, wherein the operations further comprise:
generating the metadata comprising deallocation information representative of the deallocation process.

14. The data storage system of claim 10, wherein the memory deallocator deallocates the first portion of storage from being allocated to store the first data object based on a determination that first data object comprises a duplicate of another data object stored using a different portion of the data storage system different from the first portion.

15. A non-transitory machine-readable medium, comprising executable instructions that, when executed by at least one processor of network equipment, facilitate performance of operations, comprising:
based on an indication that a data object stored using storage resources of a data storage system is to be deleted, identifying metadata of a first chunk of storage of the data storage system, wherein the storage resources comprise the first chunk of storage;
based on the metadata of the first chunk of storage, selecting an approach of a set of approaches to designate the first chunk of storage as available for storage of another data object other than the data object, resulting in a selected approach; and
designating the first chunk of storage as available in accordance with the selected approach, wherein the set of approaches comprises a first approach that comprises copying data referenced by another data object to a second data chunk of storage of the data storage system before designating the first chunk of storage as available for storage of other data objects other than the data object.

16. The non-transitory machine-readable medium of claim 15, wherein the set of approaches further comprises a second approach different from the first approach, that comprises designating the first chunk of storage as available for storage of the other data objects without first copying any data from the first chunk of storage to the second data chunk of storage, wherein the second approach is selected based on the metadata specifying that no other data object references any data stored using the first chunk of storage, and wherein the second approach further comprises designating the first chunk of storage as available without first copying any data referenced by another data object other than the data object, to the second data chunk of storage.

17. The non-transitory machine-readable medium of claim 16, wherein the metadata specifying the approach was generated at a time that the data object was stored at the first chunk of storage.

18. The non-transitory machine-readable medium of claim 17, wherein the metadata generated at the time that the data object was stored comprises initial metadata, and wherein the initial metadata was changed, before the indication that the data object is to be deleted, to changed metadata, based on at least one data object of data objects that reference the first chunk of storage being determined to have changed.

19. The non-transitory machine-readable medium of claim 18, wherein the initial metadata comprised first metadata representative of the second approach based on the at least one data object being determined to comprise only the data object, and wherein the changed metadata comprised second metadata representative of the second approach, based on the at least one data object referencing the first chunk of storage being determined to comprise the data object and at least one other data object other than the data object.

20. The non-transitory machine-readable medium of claim 15, wherein the first chunk of storage and the second chunk of storage are comprised in chunks of storage of the data storage system having a fixed chunk size.

* * * * *